Feb. 23, 1926.
N. E. RABER
1,573,862
VULCANIZING APPARATUS
Filed August 31, 1922    2 Sheets-Sheet 1
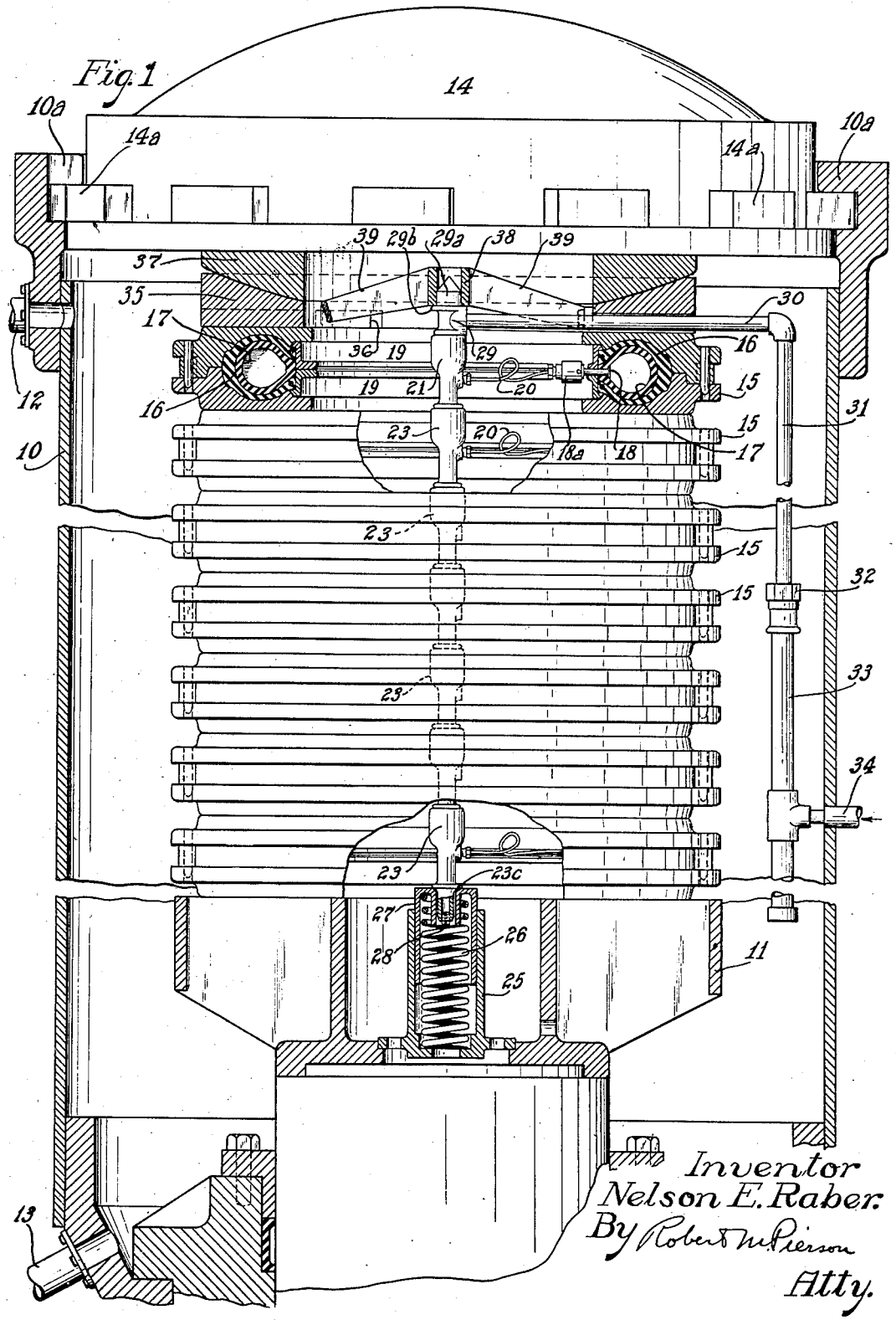
Inventor
Nelson E. Raber.
By Robert M. Pierson
Atty.

Feb. 23, 1926.
N. E. RABER
1,573,862
VULCANIZING APPARATUS
Filed August 31, 1922    2 Sheets-Sheet 2
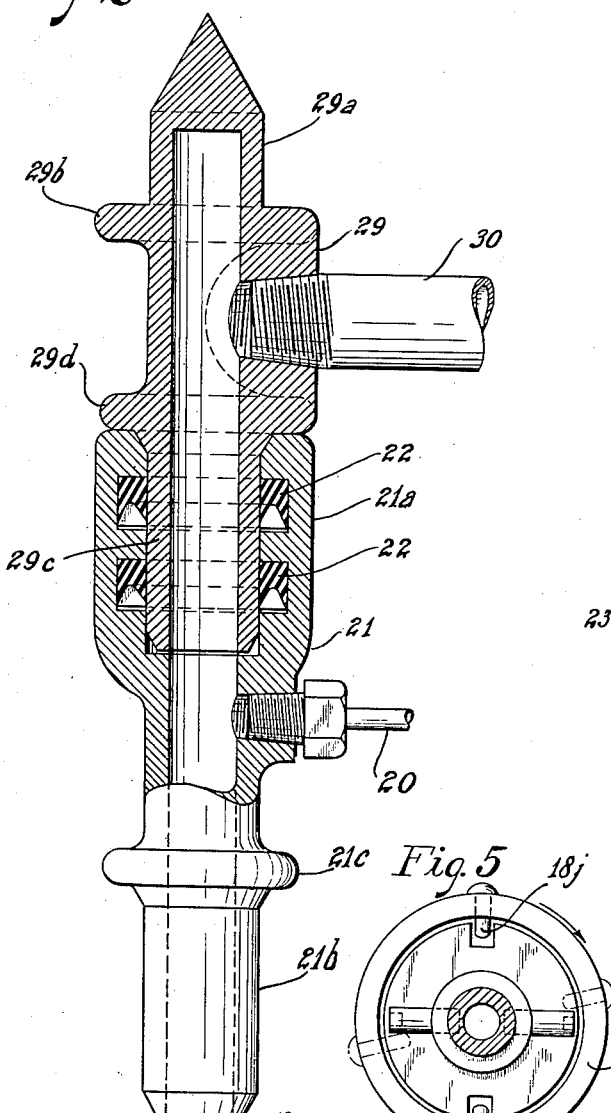
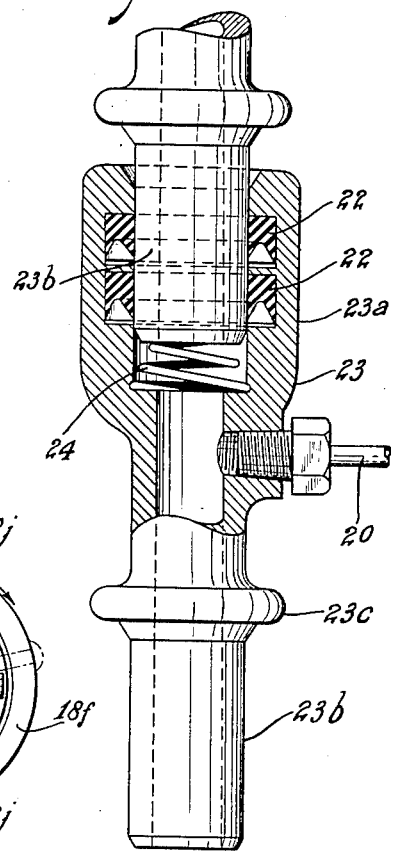
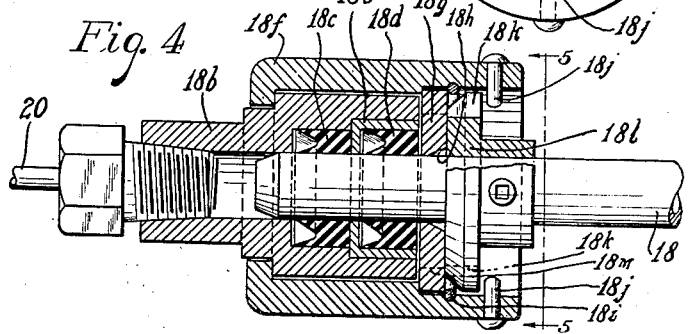
Inventor
Nelson E. Raber.
By Robert M. Pierson
Atty.

Patented Feb. 23, 1926.

1,573,862

UNITED STATES PATENT OFFICE.

NELSON E. RABER, OF AKRON, OHIO, ASSIGNOR TO THE B. F. GOODRICH COMPANY, OF NEW YORK, N. Y., A CORPORATION OF NEW YORK.

VULCANIZING APPARATUS.

Application filed August 31, 1922. Serial No. 585,336.

*To all whom it may concern:*

Be it known that I, NELSON E. RABER, a citizen of the United States, residing at Akron, in the county of Summit and State of Ohio, have invented a certain new and useful Vulcanizing Apparatus, of which the following is a specification.

This invention relates to apparatus for vulcanizing hollow articles under internal fluid pressure and is especially applicable to apparatus for so vulcanizing pneumatic tire casings.

Its general object is to provide improved, readily assembled and disassembled means for conducting pressure fluid into several hollow articles contained in molds stacked upon each other, as in the case of tire molds stacked in a vertical vulcanizer or heater press. A more specific object is to provide improved coupling members adapted to be connected through branch pipes with respective hollow articles and to constitute parts of respective mold assemblies which may be handled each as a unit, the coupling members being adapted to be connected up with each other by relative axial movement, as their respective molds are stacked upon each other, to form a trunk conduit for conveying pressure fluid into the hollow articles, and so to eliminate the labor and inconvenience of making screw connections or other difficult connections with such a conduit within the heater-press or after the several molds have been assembled together. A further object is to provide, with such coupling devices, associated parts such that said coupling devices may be effectively and conveniently coupled together notwithstanding irregularities in the dimensions or positioning of the corresponding molds.

Of the accompanying drawings:

Fig. 1 is a vertical section, with parts broken away, of a vertical heater-press or vulcanizer, with a stack of tire molds therein, showing a preferred form of my improved apparatus.

Fig. 2 is an elevation, partly in section, of the uppermost of the series of mold assembly coupling members, a terminal positioning and coupling member mated therewith, part of a fluid-supply pipe leading into the latter, and part of a branch pipe leading from the first said coupling member.

Fig. 3 is a similar view of a modified form of coupling member and part of an adjacent coupling member mated therewith.

Fig. 4 is a longitudinal section of a nipple-and-socket coupling for one of the branch pipes.

Fig. 5 is a section on line 5—5 of Fig. 4.

Referring to the drawings, 10 is a vertical heater-press or vulcanizer having a ram with a head 11 therein, and said vulcanizer is provided with the usual steam supply pipe 12 and vent pipe 13, controlled by suitable valves (not shown) and with a cover or lid 14, said cover being adapted to serve as the upper platen of the press of which the ram head 11 constitutes the lower platen, said lid being provided with lugs $14^a$, $14^a$ on its outer periphery adapted to interlock with lugs $10^a$, $10^a$ on the top of the vulcanizer. A stack of tire molds 15, 15, are mounted upon the ram head, 16 is one of the tire casings within the molds, 17 is an expansible core or water-bag within the casing, provided with a fluid inlet pipe or stem 18, and 19, 19 are bead-coupling rings clamped between the mold sections, accommodating said core stem and embracing the bead portions of the tire casing. I do not wholly limit my invention, however, to the specific means here shown for confining pressure fluid to the space within the tire.

Secured to each of the core stems 18 by a detachable nipple-and-socket coupling $18^a$, hereinafter described in detail, is a flexible pipe 20, connected at its opposite end with a fluid coupling member 21 or 23, at an intermediate part of the latter. The upper part of said fluid coupling member is formed as a female coupling portion or socket $21^a$, or $23^a$ which is provided with two annular, two-flanged lip-packing members 22, 22 (Fig. 2 or Fig. 3), preferably of soft rubber, occupying and substantially filling annular recesses in the inner wall of said female coupling portion, their outer flanges being adapted to seal against the latter and their inner flanges to seal against a complementary male portion or plug $21^b$ or $23^b$ formed on a coupling member mating therewith, each of the coupling members 21 or 23 being formed with such a male portion or plug opposite its female portion and separated therefrom by an annular, external, stop-flange $21^c$ or $23^c$.

The modified coupling member, 23, shown in Fig. 3, is so formed and proportioned as to accommodate a compression spring 24 in a counter-bore in the base of its female coupling portion 23ª, said spring being adapted to serve as a yielding stop for the male portion 23ᵇ of a similar coupling member mated therewith. Either the type of coupling member shown at 21 in Fig. 2 or that shown at 23 in Fig. 3 may be used throughout the series, or the member 21 may be used at the top of the series and members such as 23 used for the other mold assemblies, as indicated in Fig. 1.

Mounted in the center of the ram-head 11, which is formed with a cavity to accommodate it, is a vertical spring sleeve 25 containing a compression spring 26 adapted yieldingly to urge upward a slide 27 mounted in said sleeve, the upper end of said slide being formed with a recess adapted to receive the male portion of the lowermost coupling member 23, which is closed by a plug 28, and the upper end of said slide is adapted to be abutted by the stop-flange 23ᶜ of said lowermost coupling member and so yieldingly to support the stack of coupling members.

Mated with the uppermost coupling member, 21, is a positioning and coupling member 29 having at its top a tapered stud 29ª extending upwardly from a stop-flange or shoulder 29ᵇ and at its bottom a male coupling portion 29ᶜ extending downwardly from a stop-flange or shoulder 29ᵈ. A horizontal pressure-fluid pipe 30, overlying one side of the uppermost mold 15, leads into one side of said coupling member 29, said pipe being connected by an elbow at its other end with a vertical pipe 31 slidably telescoped, through a slip joint 32, with a stationary vertical pipe 33 supported within the vulcanizer by a pipe 34 traversing a wall of the latter, the pipe 33 being in communication, through the pipe 34, with a source of pressure fluid (not shown).

An annular platen 35 rests upon the top mold 15, said platen being formed with a flat lower face interrupted by radial grooves adapted alternatively to accommodate the pipe 30, one of said grooves, not in use, being shown at 36, and with a spherically convex upper face adapted to receive the complementary face of an annular platen 37, held down by the heater-press cover 14, the platen 37 being adapted, with the platen 35, to act as a ball and socket joint and so to equalize the pressure of the latter upon the several sides of the stack of molds. The platen 35 is provided with a central, female, guiding or positioning member 38 secured thereto by radial arms 39, 39, said female member being adapted to fit over the stud 29ª as the platen is mounted upon the stack of molds, laterally to position the coupling member 29 and thereby the stack of coupling members 21, 23 thereunder, and, by bearing upon the flange 29ᵇ of said coupling member 29, to assure proper penetration of each male portion of the several coupling members into the female portion of the next lower coupling member.

The nipple-and-socket coupling 18ª comprises a socket member 18ᵇ in continuation of the flexible pipe 20 said socket member being internally provided with two annular, two-flanged lip-gaskets, 18ᶜ, 18ᵈ, the innermost, 18ᶜ, being mounted in a concentric counter-bore and retained therein by an internally flanged sleeve 18ᵉ mounted in a larger concentric counter-bore and accommodating the lip-gasket 18ᵈ. 18ᶠ is a sleeve swiveled on the socket member 18ᵇ and retained in position by an internal ring 18ᵍ, whose inner periphery is beveled as shown at 18ʰ to facilitate the entrance of the core stem 18, said ring being retained in said sleeve by a spring-key 18ⁱ fitting in a groove in the inner face of said sleeve. The sleeve 18ᶠ is provided at its outer end with inwardly projecting studs 18ʲ, 18ʲ adapted to pass through notches 18ᵏ, 18ᵏ formed in the outer periphery of a stop-collar 18ˡ secured upon the stem 18 and, when the sleeve is rotated to bring the studs into their dotted positions of Fig. 5, to hold the coupling assembled. The ring 18ᵍ is formed at its outer periphery with notches 18ᵐ, 18ᵐ so that it may pass the studs 18ʲ, the spring key 18ⁱ being removed, in taking apart or assembling the female portion of the coupling, as in renewing the gaskets 18ᶜ, 18ᵈ.

In the operation of the apparatus the tires are assembled with their respective expansible cores, bead clamping rings and molds, as shown in section in Fig. 1, and the mold assemblies are then successively stacked upon the ram head 11, the latter being raised to the top of the vulcanizer to receive the first mold and then gradually lowered to keep the top of the growing stack of molds at a convenient elevation, and the pipe structure 30, 31 being raised and turned in its slip-joint 32 to clear the way for the stacking of the molds. After the first mold assembly is placed on the ram head, one of the coupling members, 21 or 23, having its lower end closed by the plug 28, is mounted on the slide 27, its flexible pipe being connected, by the coupling 18ª, either before or after the placing of the mold, with the core stem 18 of said first mold assembly. In like manner successive mold assemblies and coupling members without the plug 28 are stacked on the ram head with their couplings 18ª connected up, each of the coupling members 21 or 23 mating with the one last placed, the flexible pipes 20 permitting them to be built up in a straight, vertical stack, avoiding cramping, even though the molds be not positioned with perfect accuracy. Either the coupling members such as the one shown in Fig. 2 or such as the one shown in Fig. 3, the latter having the spring 24, may be used throughout the stack, the spring 28 in the ram head, in either case, in combination with the flexible pipes 20, permitting the coupling members to assume their proper positions, but the type of coupling member shown in Fig. 2 is preferably used for the uppermost mold, assuring a firm connection with the positioning and coupling member 29 by reason of the deep penetration and complete seating of the latter in a coupling member of said type. The stack of mold assemblies, including the coupling members, being thus built up, the ram meanwhile being gradually lowered to facilitate the operation, the pipe structure 30, 31 is turned back, to bring the pipe 30 over the mold stack, and lowered onto the latter, the male portion of the positioning and coupling member 29 being inserted in the female portion of the uppermost coupling member as shown in Fig. 2. The platen 35 is then mounted upon the stack of molds, one of the grooves 36 accommodating the pipe 30, and the female positioning member 38 fitting over the stud 29ª, the platen 37 and the heater-press cover 14 are applied, and the ram is then forced upward, holding the molds firmly closed and the stack of coupling members in mated relation. A heating fluid is then let into the vulcanizer through the inlet pipe 12, the vulcanizer being vented through the pipe 13 according to such time and temperature schedule as may be preferred and the tires are thus vulcanized. At such time during the vulcanizing operation as may be preferred a pressure fluid is admitted, through the pipes 33, 31, 30, the coupling members and the flexible pipes 20, to the several cores 17, distending the latter and so pressing the tires against their molds. The vucanization being thus completed, the mold assemblies are removed from the vulcanizer by a reversal of the operations just described.

The apparatus described is of simplified construction as compared with apparatus heretofore known and requires less care and accuracy in the stacking of the molds. The lip-gaskets 22, by reason of the fact that they substantially fill the recesses in which they are mounted, do not require clamping means to hold them in their seats, and hence may readily be replaced by simply pulling them from their recesses and springing new gaskets into their places. The construction of the telescoped pipe structure 30, 31, 33 is such that no threaded or other inconvenient couplings are required in the pressure fluid line, which therefore may be readily connected up with and disconnected from the stack of coupling members.

The apparatus here described is susceptible of modifications within the scope of my invention, and I do not wholly limit my claims to the specific construction here shown.

I claim:

1. Vulcanizing apparatus comprising a plurality of molds and means associated with each of said molds for conducting pressure fluid into a hollow article contained therein, said means comprising a conduit-section for each mold, the several conduit-sections being adapted to be connected to provide a trunk conduit as the molds are assembled together, a branch conduit member leading from each conduit-section, and a coupling device connecting each of said members with the space within its mold, each of said coupling devices including a lip gasket interposed operatively between its mating members.

2. Vulcanizing apparatus comprising a mold and means for conducting pressure fluid into a hollow article contained therein, said means comprising an inlet stem projecting from said mold and a fluid-supply pipe connected therewith, the connection comprising male and female fluid-conducting members mated in telescoped relation, and a lip-gasket acting transversely of the conduit to form a seal between said members.

3. Vulcanizing apparatus comprising a mold and means for conducting pressure fluid into a hollow article contained therein, said means comprising an inlet stem projecting from said mold and a flexible fluid-supply pipe, a coupling device of the bayonet-lock type for connecting said pipe with said stem, and a lip gasket for sealing the connection.

4. Vulcanizing apparatus comprising a vulcanizer, a ram therein, a plurality of annular molds stacked upon said ram, a manifold within the stack of molds and communicating with the space within each mold, pressure-fluid-conducting means leading into the vulcanizer and within the latter having a movable part traversing one side of the uppermost annular mold, and detachable means connecting said pressure-fluid conducting means with said manifold.

5. Vulcanizing apparatus for hollow, annular articles, said apparatus comprising a vulcanizer, a ram therein, a plurality of annular molds stacked upon said ram, means associated with each of said molds for conducting presure fluid into a hollow article contained therein, at the inner periphery of the latter, said means including a coupling member, the several said coupling members being adapted to be connected with each other in a stack within the stack of molds to form a trunk conduit as said molds are stacked upon said ram, pressure-fluid-conducting means leading into said vulcanizer through a permanently fixed part thereof and adapted to be connected with said trunk conduit, said pressure-fluid-conducting means including a pipe structure within the vulcanizer, a part thereof being adapted to overlie and traverse the uppermost mold, a positioning and coupling member on said pipe structure adapted to mate with the uppermost of the aforementioned coupling members, and a positioning member adapted to rest upon the stack of molds and engage said positioning and coupling member to position the stack of coupling members.

6. Vulcanizing apparatus for hollow, annular articles, said apparatus comprising a vulcanizer, a ram therein, a plurality of annular molds stacked upon said ram, means associated with each of said molds for conducting pressure fluid into a hollow article contained therein, at the inner periphery of the latter, said means including a coupling member, the several said coupling members being adapted to be connected with each other in a stack within the stack of molds to form a trunk conduit as said molds are stacked upon said ram, pressure-fluid-conducting means leading into said vulcanizer through a permanently fixed part thereof and adapted to be connected with said trunk conduit, said pressure-fluid-conducting means including a telescoped pipe structure within the vulcanizer, a part thereof being adapted to overlie and traverse the uppermost mold, a positioning and coupling member on said pipe structure adapted to mate with the uppermost of the aforementioned coupling members, a positioning member adapted to rest upon the stack of molds and engage said positioning and coupling member to position the stack of coupling members, said positioning member being formed with a spherically concave upper face, and a member formed with a complementary, spherically convex surface mating with said positioning member and adapted to be forced against the cover of the vulcanizer by said ram.

7. Vulcanizing apparatus for hollow, annular articles, said apparatus comprising a vulcanizer, a ram therein, a plurality of annular molds stacked upon said ram, means associated with each of said molds for conducting pressure fluid into a hollow article contained therein, at the inner periphery of the latter, said means including a coupling member, the several said coupling members being adapted to be connected with each other within the stack of molds to form a trunk conduit as said molds are stacked upon said ram, pressure-fluid-conducting means leading into said vulcanizer through a permanently fixed part thereof and adapted to be connected with said trunk conduit, said pressure-fluid-conducting means including two slidably telescoped pipes, means for supplying pressure fluid to said pressure-fluid-conducting means, and means for letting heating fluid into said vulcanizer.

8. Vulcanizing apparatus comprising a plurality of molds and means associated with each of said molds for conducting pressure fluid into a hollow article contained therein, said means comprising a slip-coupling member for each mold, the several slip-coupling members being adapted to be connected together to provide a trunk conduit as the molds are assembled together, a flexible branch pipe connecting each slip-coupling member with its mold, transversely-acting lip-gaskets sealing said slip-coupling members against each other, and yielding means acting axially of the assembled set of slip-coupling members to prevent their unmating.

9. In apparatus of the character described, the combination of means for supporting a hollow article to be vulcanized, means for heating said article, and means for conducting pressure fluid into said article, said means including a flexible pipe in communication at one end with the space within the article, a coupling member connected with the other end of said flexible pipe and formed with a plug and with a socket opposite each other, a lip gasket associated with a part of said coupling member and adapted to seal against a complementary coupling member, and a compression spring in the socket of said coupling member adapted yieldingly to limit the penetration of a plug thereinto.

10. In apparatus of the character described, the combination of means for supporting a hollow article to be vulcanized, means for heating said article, and means for conducting pressure fluid into said article, said means including a coupling member formed with a socket and with a plug and a lip-gasket occupying and substantially filling an annular recess in the wall of said socket and adapted to seal against a plug inserted in the latter.

11. Vulcanizing apparatus comprising a plurality of molds, means for each of said molds for conducting pressure fluid into a hollow article contained therein, said means including a coupling member and the several said coupling members being adapted to be connected in series to form a trunk conduit as said molds are assembled in juxtaposition to each other, said means also including a flexible branch pipe from said coupling member to its mold, and a slip coupling at the end of said branch pipe, for connecting the latter with the space within the hollow article, said slip coupling including a lip-gasket and means for locking said slip coupling in assembled relation.

12. Vulcanizing apparatus comprising a plurality of molds, means for each of said molds for conducting pressure fluid into a hollow article contained therein, said means including a coupling member and the several said coupling members being adapted to be connected in series to form a trunk conduit as said molds are assembled in juxtaposition to each other, said means also including a flexible branch pipe from said coupling member to its mold, and a slip coupling at the end of said branch pipe, for connecting the latter with the space within the hollow article, said slip coupling including a nipple, a socket member, a lip-gasket between said nipple and said socket member, a sleeve swiveled on said socket member, a stop member secured on said nipple, and means on said sleeve for engaging said stop member to hold the coupling in assembled relation.

In witness whereof I have hereunto set my hand this 19th day of August, 1922.

NELSON E. RABER